J. Mattison,
Friction Clutch.
N° 53,846.   Patented Apr. 10, 1866.
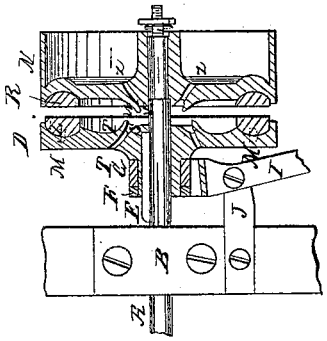
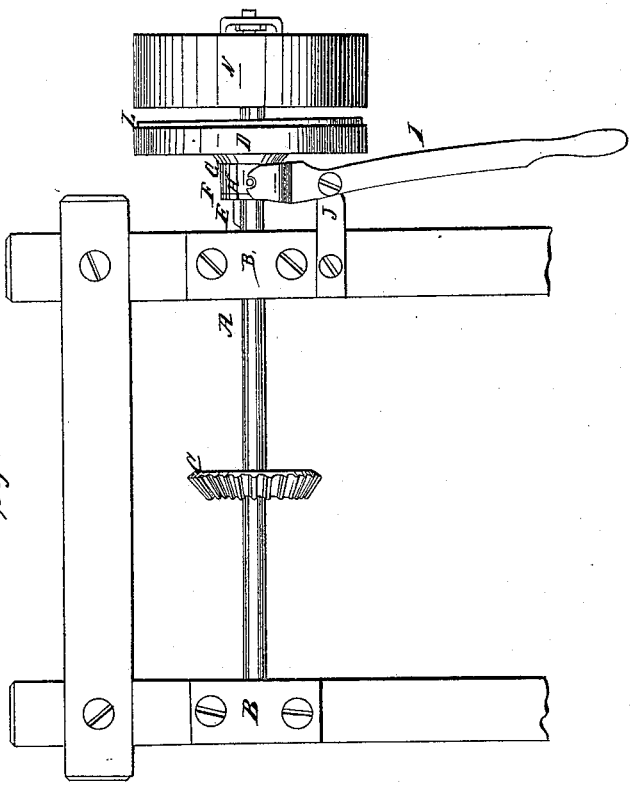
Witnesses:
Augustus Pohlers
C. A. Blanchard
Inventor:
Judson Mattison
By his Atty. S. Dennis Jr.

UNITED STATES PATENT OFFICE.

JUDSON MATTISON, OF OSWEGO, NEW YORK.

IMPROVEMENT IN FRICTION-COUPLINGS.

Specification forming part of Letters Patent No. 53,846, dated April 10, 1866.

*To all whom it may concern:*

Be it known that I, JUDSON MATTISON, of the city and county of Oswego, and State of New York, have invented certain new and useful Improvements in Friction - Couplings for Shafting and Machinery; and I do hereby declare that the following description and accompanying drawings are sufficient to enable any person skilled in the art or science to which it most nearly appertains to make and use my said invention or improvements without further invention or experiment.

The nature of my invention and improvement consists in the use and application of vulcanized india-rubber as an elastic friction substance—that is, one or both of the friction surfaces by which the motion is communicated is made of vulcanized india-rubber; also, in the peculiar construction and arrangement of oil-vessels with their canals or drain-holes.

In the accompanying drawings, Figure 1 represents an upright shaft and pulley with a friction-coupling, and Fig. 2 a section of the pulley and coupling cut perpendicularly through the center.

In these drawings, A is an upright shaft with its journals arranged to turn in the boxes B B. To this shaft A the gear C, pulley, or other device is fastened to operate the machinery to be propelled by the friction-coupling.

D is a plate fitted to traverse freely on the shaft A, and is prevented from turning on the shaft by the feather or spline E, fastened in the shaft and fitted to a groove in the hole of the plate D.

The hub F of the plate D has a groove around its periphery, to which groove the collar G is fitted, so that the hub of the plate turns freely in it, which collar has a projecting pivot, H, on each side for the forked lever I, which traverses the plate and which vibrates on a screw in the stand J.

The plate D has a circular groove on its upper surface, near the periphery, for the vulcanized-rubber ring L, which is fastened in the groove by the screws M M, screwed from the under side of the plate up into the rubber, as shown in Fig. 2. This rubber ring L is made thick enough to project some distance above the sides of the groove in the plate, so that when it is raised up and pressed against the under side of the pulley N the friction of the rubber will cause the pulley to turn the plate D and shaft A.

N is a pulley fitted to turn freely on the shaft A, but not to traverse. It is wide enough on its periphery for a belt to turn it and operate the shaft A. There is a groove in the under side of the pulley N, corresponding with the groove in the upper side of the plate B, which groove in the pulley is fitted with a vulcanized india-rubber ring, R, fastened in it, for the ring L to act against when the coupling is closed.

The operation is as follows: The pulley N, being turned by a band from some moving power, revolves freely on the shaft, which remains stationary until the lever I is depressed and the rubber in the plate D is brought up against the rubber in the pulley N, or against the under side of the pulley if it has no rubber on it, and sufficient friction is produced between the plate and pulley to make the pulley turn the plate and shaft A.

There is a recess or canal, S, in the upper side of the plate D, around the shaft A, formed by a flange, T', which projects upward and inward, as shown in Fig. 2, to prevent the oil applied to the shaft from spreading to the india-rubber ring L. From this canal S there are some drain-holes T for the oil to pass down through the plate. There is an oil vessel or canal, V, in the under side of the pulley N, formed by the flange W around the shaft, to prevent the oil from spreading on the under side of the pulley to the friction-surface of the pulley. The diameter of the flange W should be smaller than the flange T', so that the oil which drops from W will fall within the flange T', and if the coupling is placed on a horizontal shaft the flange W should be made so long and so small as to project into the canal S, and there should be some drain-holes Z Z through the pulley.

The great advantage of my coupling over others is in the elasticity or spring of the friction-surfaces of rubber, which in a manner take hold but yield sufficiently not to tear the surface by contact or concussion, and at the same time communicate the motion so gently, even when running at a high speed, that there will be very little shock or concussion, which is so destructive to machinery.

What I claim as my invention and improve- ment in friction-couplings for shafting and machinery is—

1. The use and application of vulcanized india-rubber as an elastic friction substance, to be used in the manner and for the purpose specified.

2. The construction and arrangement of the oil vessels or canals S and V with their drains or holes T and Z, for the purpose set forth and described.

JUDSON MATTISON.

Witnesses:
F. S. SMITH,
JOHN FULLER.